June 1, 1926.

A. C. VANADIA 1,587,091

SAFETY GAS JET ATTACHMENT

Filed Jan. 25, 1924

INVENTOR.
Anthony C. Vanadia
BY Parker & Burton
ATTORNEY.

Patented June 1, 1926.

1,587,091

UNITED STATES PATENT OFFICE.

ANTHONY C. VANADIA, OF FLINT, MICHIGAN.

SAFETY GAS-JET ATTACHMENT.

Application filed January 25, 1924. Serial No. 688,354.

My invention relates to an attachment for a gas jet.

The object is to provide a safety valve to control the flow of gas through the conduit to the jet. Accidental escape of gas from a gas jet, such as lighting fixtures or the gas burners of stoves, is productive of a great deal of injury. It is highly desirable that the shut-off valve be so constructed as to be incapable of accidental actuation to permit escape of the gas from the jet. My valve construction is such that the valve automatically locks in the closed position. Before the valve can be actuated it is necessary that the locking mechanism be released. The construction is of such a character that this cannot inadvertently happen.

My improved locking mechanism is of such a character that it also serves the purpose of a stop to limit the opening movement of the valve.

A further important feature is the provision of a simple, inexpensive coupling conduit provided with an improved shut-off valve possessing the above characteristics, which coupling may be easily and quickly installed in any suitable joint in the gas pipe line to control the flow of gas therethrough. My improvement is simple, inexpensive, easy to install, self-locking, secure against unintentional operation, positive in action.

The above and other objects, together with details of construction, will more fully appear from the following specification descriptive of the embodiment of my invention illustrated in the accompanying drawing and defined in the appended claims.

In the drawings,—

Figure 1:
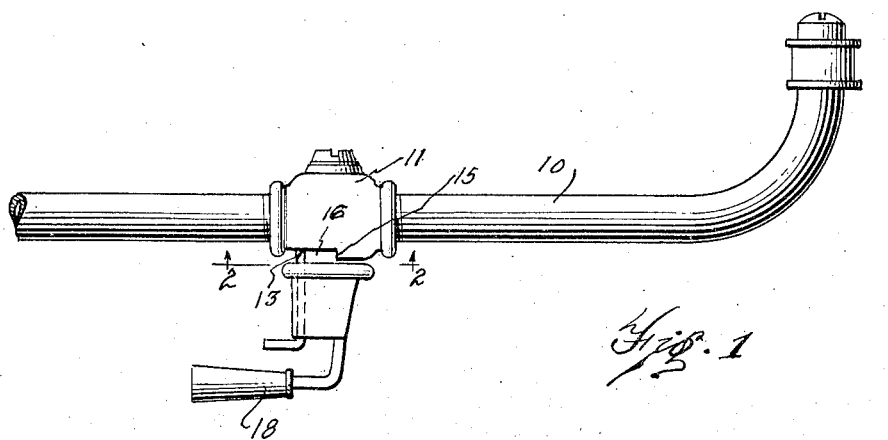
Figure 1 is a side elevation of my improvement.
Figure 2:
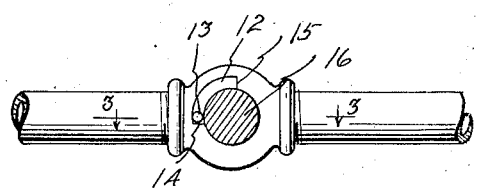
Fig. 2 is a plan view, partly in section, taken on the line 2—2, Fig. 1.
Figure 3:
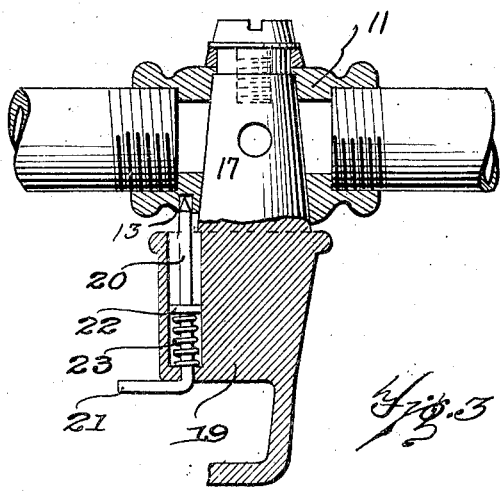
Fig. 3 is a vertical sectional view taken on the line 3—3, Fig. 2.

I have shown my improvement in connection with a gas line such as is common in gas lighting fixtures. The conduit is indicated as 10 and in the joint in the conduit is inserted a coupling 11 screw-threaded at each end as shown in Fig. 3 to be securely and easily inserted in place. This coupling is provided with an arcuate flattened portion 12 having a recess 13 and a shoulder 14 adjacent the recess and a shoulder 15 spaced from the recess at the opposite edge of the flattened portion. This arcuate flattened portion measures the movement of travel of the valve. The valve mechanism is conventional, comprising a stem 16 carrying a ported valve member 17. The stem is provided with a handle 18. The valve stem carries a support 19 for a spring-controlled plunger 20. As shown in the drawing, this plunger has a handle 21 and a stop 22. A spring 23 is disposed between the end of the recess in the support and the stop 22 on the plunger to exert downward pressure on the plunger. The end of the plunger travels with the movement of the valve over the arcuate flat face of the coupling. When the valve is in the closed position the end of the plunger engages in the recess 13 to lock the valve in such closed position. When it is desired to open the valve it is necessary to first raise the plunger 20 to release the end thereof from the recess 13 in order to rotate the valve. In the opening movement of the valve the end of the plunger engages the shoulder 15 to limit the opening of the valve. This provides a stop which determines the completely open position of the valve.

What I claim is:

In a fitting of the class described, a tubular coupling, a shut-off valve to control the flow of fluid therethrough having a rotatable stem provided with an angularly-extending handle, an offset boss on the stem underneath said handle, a plunger extending upwardly through said boss having a grip portion underneath said handle, said boss cored out about said plunger to receive a spring, a stop formed on the plunger fitting closely within said cored out opening to guide the plunger, a spring disposed in said cored out plunger opening in the boss engaging at one end said stop and engaging at the other end an end of said cored out opening to exert downward pressure on the plunger, said coupling provided with a flattened arcuate face arranged in the path of the plunger underneath the boss on the stem and having a shoulder at each end to engage the downwardly projecting end of the plunger to limit the rotatable travel of the stem and having a recess adjacent one shoulder to receive the end of the plunger to lock the valve in the closed position.

In testimony whereof, I sign this specification.

ANTHONY C. VANADIA.